No. 666,654.  
W. W. DINGEE.  
THRESHING MACHINE.  
(Application filed Apr. 29, 1899.)
Patented Jan. 29, 1901.
(No Model.)  
6 Sheets—Sheet 1.
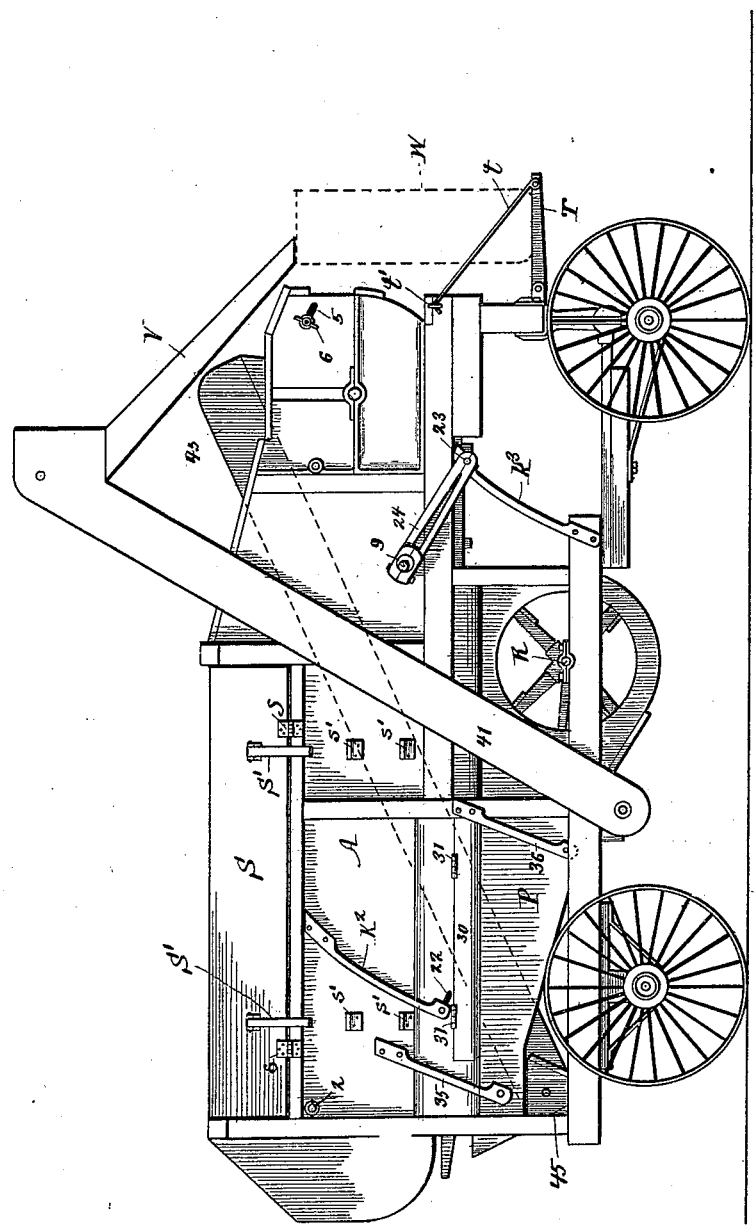

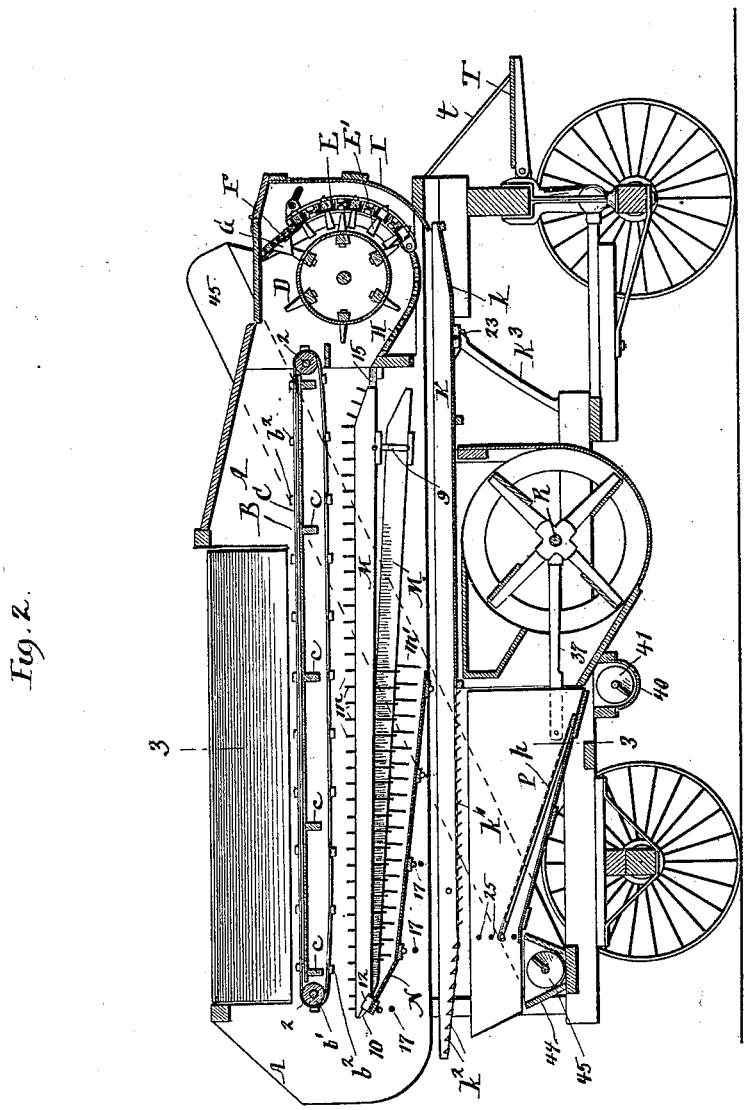

No. 666,654. Patented Jan. 29, 1901.
W. W. DINGEE.
THRESHING MACHINE.
(Application filed Apr. 29, 1899.)
(No Model.) 6 Sheets—Sheet 3.
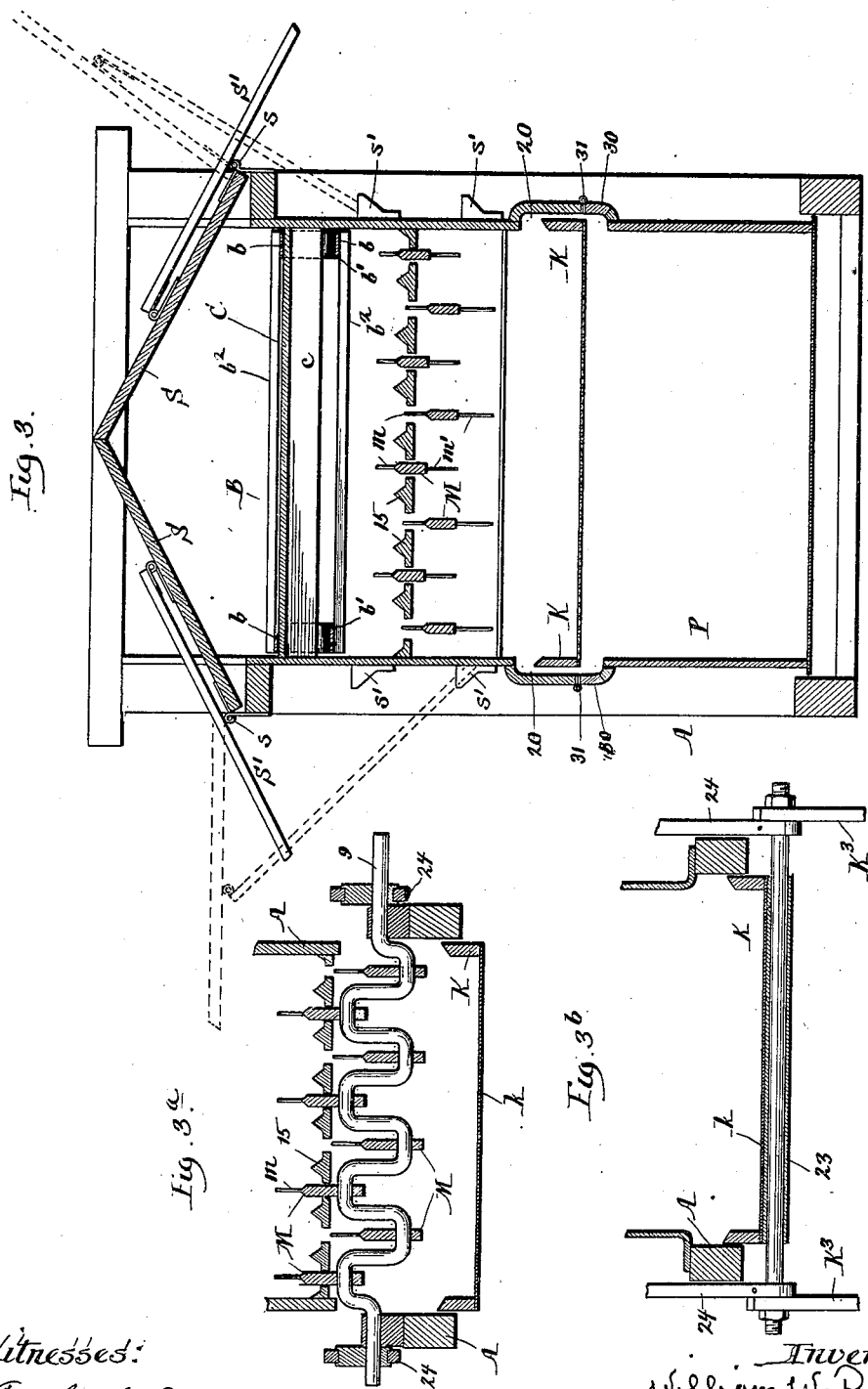

No. 666,654. Patented Jan. 29, 1901.
W. W. DINGEE.
THRESHING MACHINE.
(Application filed Apr. 29, 1899.)
(No Model.) 6 Sheets—Sheet 4.
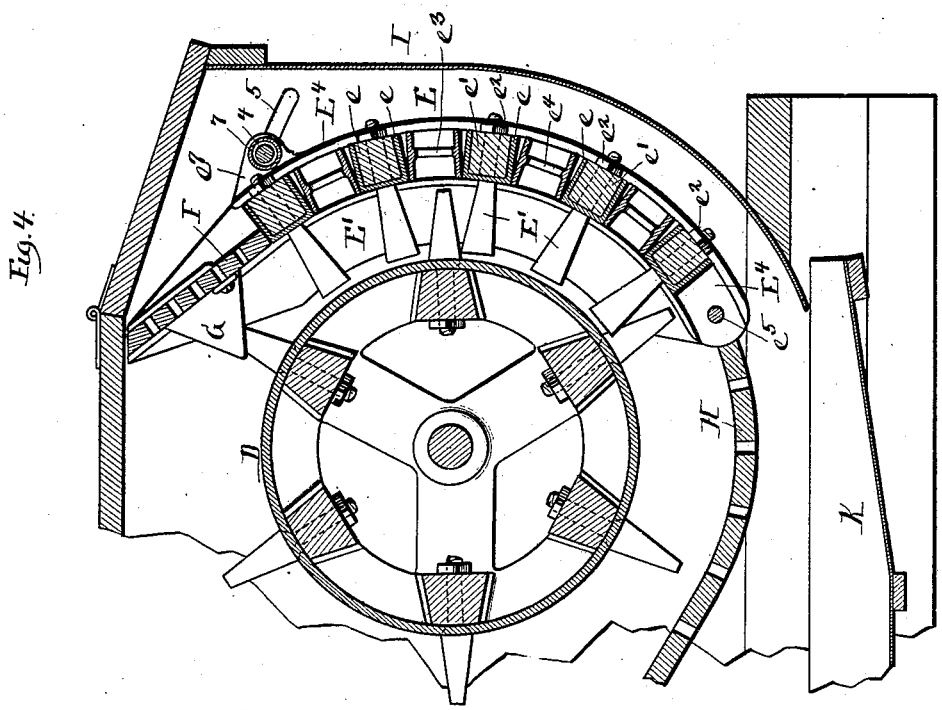
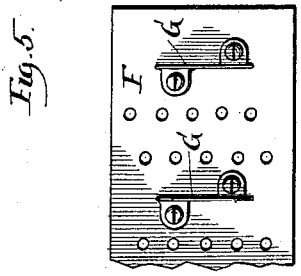
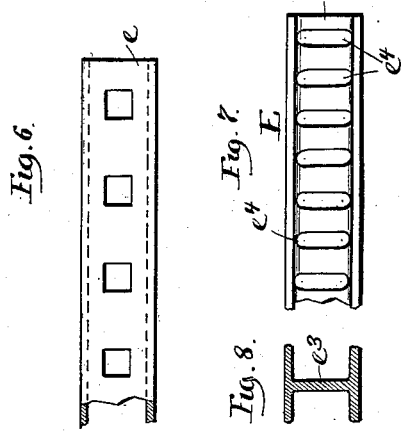
Witnesses:
Inventor:
William W. Dingee
By his Attorneys.

No. 666,654. Patented Jan. 29, 1901.
W. W. DINGEE.
THRESHING MACHINE.
(Application filed Apr. 29, 1899.)
(No Model.) 6 Sheets—Sheet 5.

Witnesses:

Inventor:
William W. Dingee
By his Attorneys.

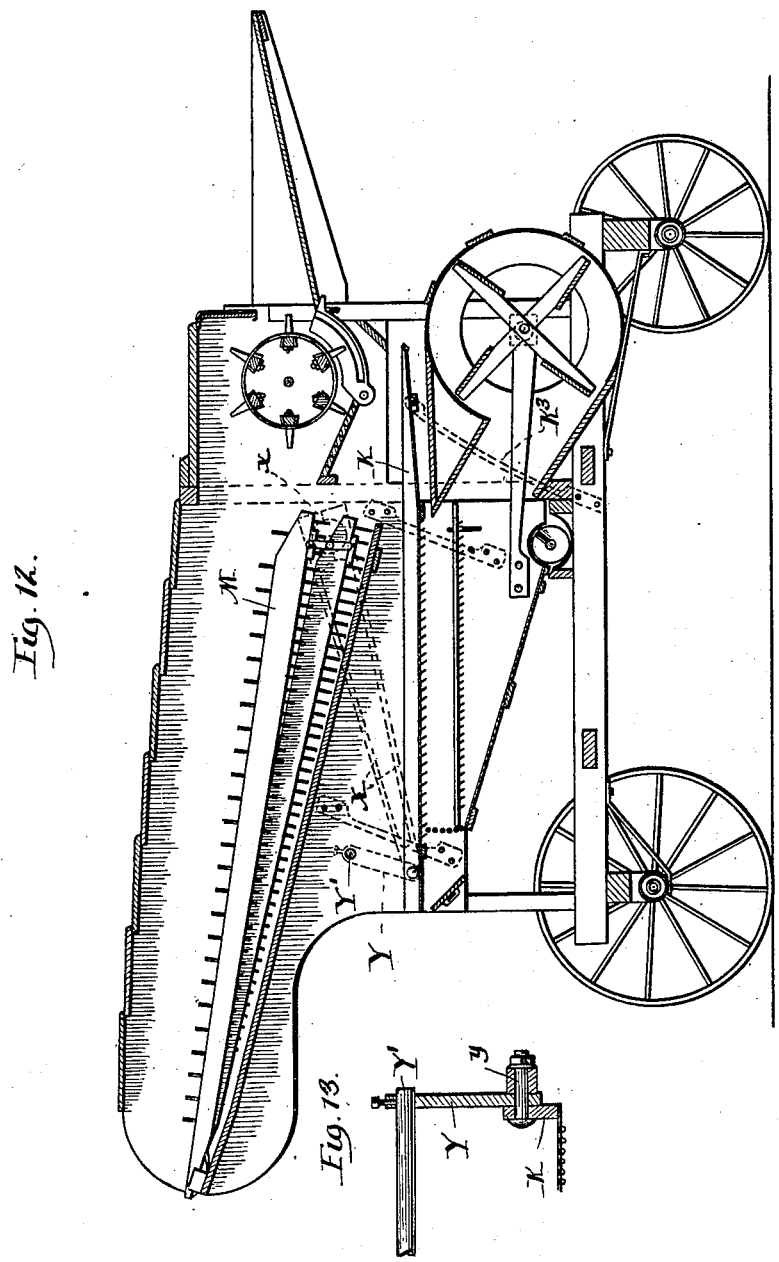

UNITED STATES PATENT OFFICE.

WILLIAM W. DINGEE, OF RACINE, WISCONSIN.

THRESHING-MACHINE.

SPECIFICATION forming part of Letters Patent No. 666,654, dated January 29, 1901.

Application filed April 29, 1899. Serial No. 714,941. (No model.)

*To all whom it may concern:*

Be it known that I, WILLIAM W. DINGEE, a resident of the city and county of Racine, in the State of Wisconsin, have invented certain new and useful Improvements in Threshing-Machines, of which the following is a full, clear, and exact description.

My present invention has for its object to provide various improvements in the construction of threshing-machines; and this object of invention is accomplished by the novel features and combination of parts hereinafter described, illustrated in the accompanying drawings, and particularly pointed out in the claims at the end of this specification.

Figure 9:
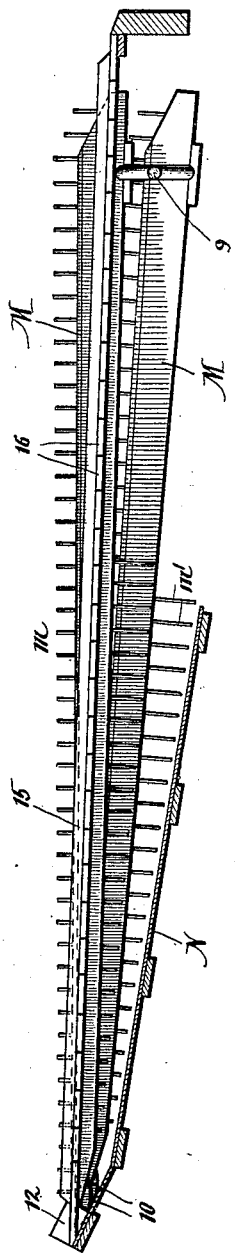
Figure 10:
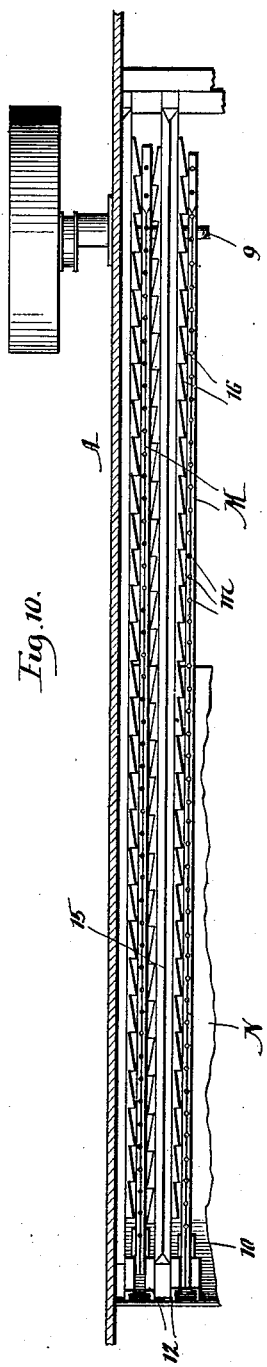
Figure 11:
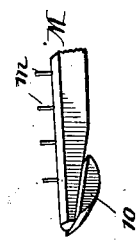

Figure 1 is a view in side elevation of a threshing-machine embodying my invention. Fig. 2 is a view in vertical longitudinal section. Fig. 3 is a view in vertical cross-section on line 3 3 of Fig. 2. Fig. $3^a$ is a view in transverse section through the machine, showing the crank-shaft whereby the rakes are driven. Fig. $3^b$ is a view in transverse section through the machine at a point adjacent the shaft 23 at the inner end of the conveyer. Fig. 4 is an enlarged detail view, in vertical section, through the threshing-cylinder, the concave, and adjoining parts. Fig. 5 is a detail view showing a part of the perforated board or plate above the concave. Fig. 6 is a detail inner face view showing part of one of the tooth-carrying bars of the concave. Fig. 7 is a detail plan view, and Fig. 8 a detail section, of one of the space-bars of the concave. Fig. 9 is a detail view, in vertical section, through the platform beneath the rakes, the rakes being shown in elevation. Fig. 10 is a plan view of the parts shown in Fig. 9. Fig. 11 is a transverse view of the outer end of one of the rakes. Fig. 12 is a view in vertical longitudinal section through a threshing-machine embodying in modified form certain features of the invention. Fig. 13 is a detail view of parts shown in Fig. 12.

In the upper part of the main frame A of the machine is mounted a slatted carrier B, that is adapted to deliver the sheaves to the threshing-cylinder. This carrier B consists, preferably, of a plurality of endless belts or chains $b$, that pass around rollers $b'$, that are carried by shafts 2, passing through the main frame, one of these shafts being provided with a drive-pulley whereby motion will be transmitted to the carrier. The belts $b$ of the carrier have fixed at suitable intervals thereon the cross-slats $b^2$. Between the ends of the carrier B extends a floor or table C, that is sustained by cross-bars $c$, and the inner support for the carrier extends to a point near the threshing-cylinder D. The cylinder D may be of any usual or suitable construction having teeth that coöperate with the teeth of the concave E in the threshing of the grain. The concave E is arranged in vertical position, and at the top of this concave is placed a perforated board or plate F, to the inner face of which are preferably fastened a series of knives or blades G, that coöperate with the cylinder-teeth in cutting the bands of the sheaves and tearing the sheaves to pieces before they reach the concave teeth. The object in employing a perforated board or plate F above the concave is to permit the passage through this board or plate of the first grain that is separated by the action of the cylinder-teeth, and thus prevent the travel of this separated grain around the concave, it being always desirable to remove the separated grain as speedily as possible. By placing the concave in upright position the threshed grain is thrown outward or downward and not in the direction of the final travel of the straw as it leaves the machine, and hence the danger of the grain passing with the straw is very materially lessened.

From the lower end of the concave E extends a perforated board or plate H, through the openings of which the separated grain will pass onto the conveyer K, that extends beneath the lower end of the concave. Around the front of the concave E and at some distance therefrom is placed the shield or casing I, Fig. 4, the lower end of which terminates at a point above the conveyer K, this shield or casing serving to direct to the conveyer separated grain that has passed through the perforated board or plate F and through the concave. The preferred construction of concave is that illustrated more particularly in Figs. 4 to 8 of the drawings—that is to say, the concave comprises a series of channel-iron bars $e$, inclosing blocks of wood $e'$, through which pass the concave teeth $E'$. The shanks of the teeth $E'$ are preferably squared to pass through corresponding holes in the channel-bars $e$, (see Fig. 6,) and the teeth are retained in position by nuts $e^2$, that engage the threaded ends of their shanks. The body of wood within each of the channel-bars $e$ serves to give an extended bearing for the teeth, and thus prevent them from becoming loose. Between the teeth-carrying bars $e$ are placed the space-bars $E^2$, preferably of the construction shown in Figs. 4, 7, and 8 of the drawings. These space-bars are shown as castings having side walls united by a transverse web $e^3$, in which web are formed the oblong holes $e^4$ for the passage of grain. The web $e^3$, that unites the side walls of the space-bars, is arranged at such distance from the inner edges of the bars as to form troughs or pockets that will serve to receive the separated grain and prevent its being swept over the concave and into the straw by the action of the cylinder, and the grain thus received in the pockets of the space-bars will pass through the holes $e^4$ and will be directed by the shield or casing I down onto the conveyer K. The pockets thus afford an extended space for arresting the grain that will pass through the contracted openings, the sides of the openings, however, being such as to prevent the passage therethrough of straw or the like. The ends of the concave bars $e$ and of the space-bars $E^2$ will be held within the curved guideways formed upon the inner face of the side bars $E^4$, that are preferably castings having ribs formed upon their inner faces to receive the ends of the concave bars and the space-bars. The lower ends of the side bars $E^4$ are pivoted upon the rod $e^5$, that extends from side to side of the main frame below the cylinder. Each of the side bars $E^4$ is shown as formed with a lug $e^7$ at its upper end, and through these lugs passes a rod 4. The ends of the rod 4 pass through slots 5 in the main casing, and the threaded ends of the rods 4 are fitted with wing-nuts 6, whereby the adjustment of the concave can be effected. The rod 4 is encircled by a pipe or tube 7, that extends between the end plates $E^4$. The perforated board or plate F will also be connected at its ends to the end plates $E^4$, so that the adjustment of this board will be in unison with the adjustment of the concave. In threshing tough grain the concave will be set toward the cylinder; but when the grain is dry and easily threshed the concave will be set farther away therefrom.

Beneath the carrier B are mounted the rakes M, eight of these rakes being shown in the drawings. The rakes are alternately connected to the oppositely-disposed cranks of the crank-shaft 9, the arrangement being such that one half the rakes are in upward position while the other half are in downward position. The crank-shaft 9, which extends through the machine and is driven in usual manner, serves to impart a movement to the rakes in both vertical and horizontal direction, and as the upper edges of the rakes M are furnished with teeth $m$ the effect of the resultant motion given to the rakes is to carry away the straw from the threshing-cylinder. By reference more particularly to Figs. 2, 9, and 10 of the drawings it will be seen that the discharge end of each of the rakes is provided upon its under side with a shoe or chafing-block 10, that rides on the inclined face of the table N, that extends beneath the rakes and from side to side of the machine. Upon this table N is mounted a series of plates 12, between which the ends of the rakes are held in a manner free to move, and the upper edges of the plates 12 extend inward and over the edges of the shoes 10, and thus serve to prevent the bounding of the free ends of the rakes, while permitting them to slide in horizontal direction. Between the rakes M are placed the bars 15, that extend longitudinally of the machine. The upper edges of these bars are formed with the double incline, so as to prevent the lodgment thereon of the grain that may be separated from the straw in its passage from the machine, and the edges of the bars 15 are shown as notched to form offset barbs or projections 16, which allow the separated grain to fall through and aid in preventing the backward movement of the straw. Preferably the lower edge of each rake is provided with a series of teeth $m'$, that aid in moving downward over the floor N any grain that has fallen from the rakes onto such floor. The floor N has its inner end extending above the conveyer K, so that any grain deposited thereon will be delivered onto the conveyer. In order to enable the proper adjustment to be given to the floor N, and consequently to the outer ends of the rakes M, I provide holes 17 in the sides of the main frame through which will pass suitable rods, that serve to sustain the floor N.

By feeding the grain to be threshed over the top of the cylinder and from the rear a much more effective separation is obtained by the cylinder itself, because the first grain that is threshed is thrown in a direction opposite to the travel of the straw as it passes out of the machine. Moreover, the carrier B, by which the grain is delivered to the threshing-cylinder D, aids materially also in the final separation from the straw of any grain carried thereby, because as the rakes M carry away the straw the slatted carrier coöperates with the rakes in beating and separating from the straw any grain that may have escaped separation in the passage of the straw through the cylinder.

The conveyer K is shown as comprising side bars, between the front portions of which extends the plate $k$, and between the rear portions of these side bars extend the sieve $k'$ and the transverse bars or open slatwork $k^2$. Hence it will be seen that all grain passing from the concave or from the floor N will be delivered onto the plate $k$ and will pass thence onto the sieve $k'$. In order to prevent grain from lodging upon the sides of the bars of the conveyer, I form the sides of the main frame of the machine with longitudinal offsets or recesses 20, as shown in Fig. 3 of the drawings, these offsets serving to receive the side bars of the conveyer, and thus remove them from the path of the descending grain. Preferably also the edges of the side bars of the conveyer are beveled inwardly, as shown, to better shed the grain.

In order to give greater elasticity of action to the conveyer K, and thus more effectively advance the grain, and in order also to reduce the power required for the operation of the conveyer, I mount the conveyer K upon suitable spring-supports. Preferably these supports consist of spring-bars $K^2$ and $K^3$, arranged at opposite sides of the machine. The bars $K^2$ have their lower ends connected to the side bars of the conveyer by journals secured to the bars K and passing through slots 22, formed in the sides of the main frame, the upper ends of the bars $K^2$ being rigidly fixed to the sides of the main frame. The lower ends of the spring-bars $K^3$ are fixed to the main frame, while their upper ends are connected to a shaft 23, that extends beneath the conveyer. Each of the outer ends of the shaft 23 is connected by a pitman 24 to the crank-shaft 9, so that the revolution of the crank-shaft serves to vibrate the conveyer. Now inasmuch as the weight of the conveyer aids its downward movement it will be seen that the springs $K^2$ and $K^3$ serve to counterbalance this weight and by so much aid in lifting the conveyer and in giving a more elastic action to its movements.

Beneath the rear end of the conveyer K is mounted the shoe P, of usual or suitable construction. This shoe may be provided with one or more sieves $p$, conveniently supported therein, the rear end of the sieve being preferably adjustable by means of holes 25, formed in the sides of the shoe and adapted to receive a rod for sustaining the rear end of the shoe at the desired angle. In order to permit the screen or screens to be conveniently removed, I form at the side of the machine a long opening closed by a door 30, preferably hinged, as at 31, to the side frame of the machine. By means of this door or opening the sieves can be conveniently inserted and removed, and this is a feature of marked advantage, particularly in threshing-machines that are equipped with stackers, since the location of a stacker at the rear of a machine is apt to seriously interfere with the easy removal and replacement of the sieves. The shoe P is sustained by spring-arms 35 and 36, and vibratory movement is imparted to the shoe by pitmen 37, driven by suitable eccentrics upon the shaft of the fan R. The lower end of the shoe terminates above the screw-trough 40, from one end of which leads the grain-conveyer 41, and beneath the rear end of the shoe is placed the trough 44, with one end of which connects the tailings-conveyer 45.

To each side of the main frame is hinged, as at $s$, a platform S, which when in the extended position shown by dotted lines at the right-hand side of Fig. 3 will serve as a support for the operator delivering the sheaves to the carrier B. When turned to the inclined position shown by dotted lines at the left-hand side of Fig. 3, the platform S will serve to direct the sheaves onto the carrier as they are thrown from the stack or other point. When the platforms S are turned to the position shown by full lines in Fig. 3, they will serve as a roof or cover for the machine. Preferably each of the platforms S is provided with brace-rods S', hinged to the platform, the free lower end of each brace-rod being adapted to engage steps or sockets $s'$, that are fastened to each side of the main frame of the machine.

At the front of the machine is provided a hinged platform or support T, adapted to sustain the bags or receptacles W, into which the grain is delivered by a spout V, leading from the grain-elevator 41. The platform T is held in horizontal position, preferably by the rods $t$ at its ends. As shown, each of the rods $t$ has its lower end connected to the front part of the platform T, while its upper hooked end passes through an eye $t'$ at the corresponding side of the main frame. When the platform T is folded up against the front of the machine, the rods $t$ will pass through the eyes $t'$.

It is manifest that the precise details of construction above set out may be varied without departing from the scope of the invention and that certain features of the invention may be employed without its adoption as an entirety. Thus, for example, the feature of providing the conveyer K with a counterbalance spring or support may be employed in connection with machines in which the endless carrier is not used, but in which the sheaves are delivered at the front of the machine, as illustrated in Fig. 12 of the drawings. In Fig. 12 the threshing-cylinder operates in connection with a concave arranged beneath it in a manner similar to the machine shown in Letters Patent No. 288,730, granted to me December 27, 1892. In the construction shown in Fig. 12, however, the forward end of the conveyer K is sustained by spring-supports $K^3$, one of such supports being arranged at each side of the machine, and a cross-rod that passes beneath the forward end of the conveyer serving to unite the upper ends of the spring arms or supports and connect them with the conveyer. The vibrating motion is imparted to the conveyer in the machine shown in Fig. 12 by pitmen X, that are driven by eccentrics $x$ on the crank-shaft 9, that actuates the rakes M. The pitmen X are pivotally connected by bolts $y$ to the side bars of the conveyer K, and these bolts $y$ pass through the lower ends of hanger-arms Y, that are carried by a rock-shaft Y', that passes from side to side of the main frame, one of the hangers Y being attached to each end of the rock-shaft Y'.

Having thus described my invention, what I claim as new, and desire to secure by Letters Patent, is—

1. In a threshing-machine, the combination of a cylinder and concave, a series of rakes for carrying away the straw and an inclined closed floor extending beneath and in proximity to the path of said rakes, a single conveyer extending from end to end of the machine and provided at its forward end with a closed part extending beneath the conveyer and beneath the front end of said floor, and being provided at its rear end with a sieve located entirely beneath said closed floor, and means for sustaining and vibrating said conveyer, consisting of spring-supports at its front end, said supports having their lower ends fixed to the main frame, a cross-rod passing beneath the front end of the conveyer and projecting beyond the sides thereof, the ends of said cross-rod being connected to the upper ends of the spring-supports, and a pitman and shaft for operating said conveyer, all substantially as described.

2. In a threshing-machine, the combination of a cylinder and concave, a series of rakes for carrying away the straw and an inclined closed floor extending beneath and in proximity to the path of said rakes, a single conveyer extending from end to end of the machine and provided at its forward end with a closed part extending beneath the conveyer and beneath the front end of said floor, and being provided at its rear end with a sieve located entirely beneath said closed floor, and means for sustaining and vibrating said conveyer, consisting of spring-supports at its front end, said supports having their lower ends fixed to the main frame, a cross-rod passing beneath the front end of the conveyer and projecting beyond the sides thereof, the ends of said cross-rod being connected to the upper ends of the spring-supports, hanger-arms arranged outside the main frame at the rear end of the conveyer, a rock-shaft passing through the machine and connected to the upper ends of said hanger-arms, pivot-bolts connecting the lower ends of said hanger-arms to the rear end of the conveyer, one of said pivot-bolts being connected to the rear end of a pitman for vibrating the conveyer.

WILLIAM W. DINGEE.

Witnesses:
M. P. DINGEE,
E. E. MUNRO.